US010015040B2

(12) United States Patent
Borgert

(10) Patent No.: US 10,015,040 B2
(45) Date of Patent: Jul. 3, 2018

(54) COMPUTER SYSTEM AND METHOD FOR MESSAGE ROUTING WITH CONTENT AND REFERENCE PASSING

(71) Applicant: Urban Software Institute GmbH, Chemnitz (DE)

(72) Inventor: Stephan Borgert, Darmstadt (DE)

(73) Assignee: Urban Software Institute GmbH, Chemnitz (DE)

( * ) Notice: Subject to any disclaimer, the term of this patent is extended or adjusted under 35 U.S.C. 154(b) by 65 days.

(21) Appl. No.: 15/162,143

(22) Filed: May 23, 2016

(65) Prior Publication Data

US 2016/0352561 A1 Dec. 1, 2016

(30) Foreign Application Priority Data

May 26, 2015 (EP) .................................... 15169119

(51) Int. Cl.

*H04L 12/891* (2013.01)
*H04L 12/58* (2006.01)

(Continued)

(52) U.S. Cl.

CPC ............ *H04L 41/046* (2013.01); *H04L 47/10* (2013.01); *H04L 47/41* (2013.01); *H04L 51/14* (2013.01); *H04L 51/34* (2013.01); *H04L 67/34* (2013.01)

(58) Field of Classification Search

CPC ......... H04L 45/56; H04L 12/28; H04L 12/58; H04L 41/046; H04L 47/10; H04L 47/41;

(Continued)

(56) References Cited

U.S. PATENT DOCUMENTS 6,442,592 B1 8/2002 Alumbaugh et al.
7,401,131 B2 * 7/2008 Robertson .............. G06Q 10/10 707/999.01

(Continued)

FOREIGN PATENT DOCUMENTS

WO 2004061605 A2 7/2004
WO 2008057649 A1 5/2008

(Continued)

OTHER PUBLICATIONS

European Search Report received for EP Patent Application No. 15169119.3, dated Oct. 23, 2015, 8 pages.

(Continued)

*Primary Examiner* — Sargon Nano
(74) *Attorney, Agent, or Firm* — Brake Hughes Bellermann LLP

(57) ABSTRACT

Message routing techniques with content passing and reference passing are described for a distributed system with a plurality of interacting agent devices. The interaction between the interacting agent devices occurs through exchange of messages. An exchanged message includes a content portion (CP) and a reference identifier (RI) associated with a particular agent device. The reference identifier (RI) enables any other agent device to establish a communication with the particular agent device. The content portion (CP) has a type which is either a content type or a message-set type. The techniques enable recipients of forwarded message(s) to perform efficient processing of the received messages.

20 Claims, 9 Drawing Sheets

(51) Int. Cl.
*H04L 12/24* (2006.01)
*H04L 29/08* (2006.01)
*H04L 12/801* (2013.01)

(58) Field of Classification Search
CPC ......... H04L 51/14; H04L 51/43; H04L 67/34; H04L 41/0816; H04L 69/161; H04W 40/20; H04W 92/18; G06F 9/444
See application file for complete search history.

(56) References Cited

U.S. PATENT DOCUMENTS 8,229,962 B1* 7/2012 Cavalancia, II . G06Q 10/06311 707/706
2002/0147611 A1* 10/2002 Greene .......... G06Q 10/063112 705/1.1
2003/0191797 A1* 10/2003 Gurevich ............ G06F 17/5009 709/200
2004/0088405 A1 5/2004 Aggarwal
2005/0108384 A1* 5/2005 Lambert ............. H04L 63/1408 709/224
2007/0143424 A1* 6/2007 Schirmer ................ H04L 12/66 709/206
2007/0156919 A1* 7/2007 Potti ......................... G06F 8/67 709/238
2008/0016194 A1 1/2008 Chetuparambil et al.
2008/0091782 A1* 4/2008 Jakobson ............... G06Q 10/10 709/206
2008/0307320 A1 12/2008 Payne et al.
2009/0006632 A1* 1/2009 Ramanathan ....... H04M 3/2218 709/228
2009/0182820 A1* 7/2009 Hamilton, II ........ G06Q 10/107 709/206
2010/0324963 A1* 12/2010 Gupta .................. G06Q 10/107 705/7.19
2011/0078213 A1* 3/2011 Bezar ..................... G06Q 10/10 707/805
2011/0167105 A1* 7/2011 Ramakrishnan ....... G06Q 10/10 709/203
2011/0246550 A1 10/2011 Levari et al.
2011/0258268 A1* 10/2011 Banks .................... G06Q 10/06 709/206
2013/0046828 A1* 2/2013 Grewal .................. G06Q 10/10 709/204
2013/0159374 A1* 6/2013 Steiner .................... H04L 51/16 709/201

FOREIGN PATENT DOCUMENTS

WO 2008110460 A2 9/2008
WO 2011/153710 A1 12/2011
WO 2012/051366 A2 4/2012
WO 2013048929 A1 4/2013

OTHER PUBLICATIONS

Search Report for Singapore Application No. 10201603491R, dated Oct. 24, 2016, 3 pages.
Written Opinion for Singapore Application No. 10201603491R, dated Oct. 25, 2016, 6 pages.

* cited by examiner

COMPUTER SYSTEM AND METHOD FOR MESSAGE ROUTING WITH CONTENT AND REFERENCE PASSING

CROSS REFERENCE TO RELATED APPLICATIONS

This application claims priority to European Patent Application No. EP15169119, filed May 26, 2015, titled "COMPUTER SYSTEM AND METHOD FOR MESSAGE ROUTING WITH CONTENT AND REFERENCE PASSING" which is incorporated herein by reference in its entirety.

TECHNICAL FIELD

The present description generally relates to electronic data processing, and more particularly, relates to methods, computer program products and systems for message exchange.

BACKGROUND

Communication between different parties belonging to different entities is often enabled through electronic messaging systems which are controlled by one or more process execution engines to enable the interaction between the parties according to predefined behavior patterns. The communication is enabled through electronic message exchange between computing devices.

There are interaction scenarios where messages received by one party need to be forwarded to another party for further processing, and where the other party needs to establish a communication with the original message creators in order to complete processing of the messages. There may be multiple message forwarding stages resulting in a message cascade.

SUMMARY

Hence, there is a need for a message routing system and method which supports such a cascaded message forwarding across multiple forwarding stages, thereby allowing the recipients of the forwarded message(s) to perform efficient processing of the received messages.

Example embodiments relate to a message routing system and a corresponding method supporting reference passing and content passing of messages through multiple message forwarding stages.

The described functions and method steps of the message routing system can be performed by the respective modules of the system when the system is executing a corresponding computer program product, which includes a set of computer readable instructions stored in a memory of the system and executed by at least one processor of the system.

Reference passing, as used hereinafter, includes that a reference which is included in an electronic message received by a first agent device operated by a first agent (e.g., a human operator, a robot, a software component, etc., or combinations of these entities) is provided to a second agent in any manner. In general, in this specification when referring to an agent as an operator of the respective agent device it shall be understood as referring to the corresponding agent device unless specified otherwise. For example, the electronic message may be processed and forwarded to an account of the second agent on the first agent device, or the electronic message may be forwarded to a second agent device operated by the second agent. A reference, as used hereinafter, is an identifier which allows interacting with an agent device operated by an agent associated with the reference. Examples of such a reference are: an e-mail address of the respective agent, a URL associated with a web page operated by the agent or associated with a technical service for example described by a WSDL file, a QR code or bar code associated with such a URL, etc. References are sometimes also referred to as channels.

The function (internal behavior) of an agent device is controlled by a corresponding finite state machine executed by a process execution engine. The finite state machine is part of an agent class specification. As used hereinafter, a multi-agent device is a device which is linked to a multi-agent class specification. The multi-agent class specification defines a single finite state machine to control the function of one or more multi-agent devices. The one or more multi-agent devices are operated by a plurality of agents wherein the plurality of agents interacts with other agents via a respective multi-agent device in accordance with the same finite state machine. In other words, the plurality of multi-agent devices includes agent devices that all show an equivalent behavior as determined by the respective finite state machine of the multi-agent class specification. The finite state machine of a particular agent device determines which messages are sent, and when, to other agent devices, and how messages that are received from other agent devices are to be processed. In other words, the finite state machines of the agent devices (including multi-agent devices) within a distributed system enable the interaction between the agent devices of the distributed system through the exchange of electronic messages.

According to an example embodiment, a first agent device for message routing with content passing and reference passing for a distributed system with a plurality of interacting agent devices is disclosed wherein the interaction between the interacting agent devices occurs through exchange of messages. For the purpose of reference passing and content passing an exchanged message includes at least a content portion and a reference identifier associated with a particular agent or a particular agent device. For other purposes, the message may include additional information, such as a process identifier or a process instance identifier. The reference identifier enables any other agent device to establish a communication with the particular agent device originally associated with the message. For example, the reference identifier may be the URL of the message creator. However, the reference identifier can also be the e-mail address of somebody else who is affected by the message but who did not create the message herself. The content portion has a type (data type) which enables a recursive property of messages. The type is either a content type (e.g., empty content, text content, file content, etc.) which allows to include content of the respective sub-type in the content portion, or the type is a message-set type which allows to include a set of messages in the content portion of the message. This recursive data type allows building hierarchical message structures at runtime which allow at any stage of message forwarding the identification of each single reference identifier of the original messages.

The first agent device has a first interface component configured to load a first agent class specification defining a first finite state machine. For example, the first agent class specification may be stored in a storage component which is communicatively coupled with the first agent device. The storage component may include a database or a file system to store a plurality of agent class specifications (e.g., all agent class specification for a company) or it may be an onboard memory component of the first agent device in which case the first interface corresponds to an internal interface within the first agent device. The first finite state machine is configured to control the function of the first agent device when executed by a process execution engine. Process execution engines, such as for example, BPEL engines or BPMN engines are known in the art and are not addressed in more detail. Examples of finite state machines are given in the detailed description.

The first agent device is configured to interact with a plurality of multi-agent devices linked to a second agent class specification defining a second finite state machine. The first finite state machine and the second finite state machine enable the interaction of the first agent device with the plurality of multi-agent devices in that the respective state machines have the knowledge how to process messages received from the respective other agent devices and which messages to create in response. The first agent device is supposed to process a plurality of messages which are sent by the plurality of multi-agent devices. In many cases the plurality of messages may be sent at different points in time by the plurality of multi-agent devices. In such a case the messages can be asynchronously buffered in a message buffer which is communicatively coupled with the first agent device. For example, the message buffer can be a FIFO or LIFO storage component which is external to the first agent device. For example, a company may provide a central message buffer for all agent devices of the company. In this case, the first agent device has a second interface component configured to retrieve at least a subset of a plurality of messages from the message buffer. In one embodiment, the first agent device may have an internal message buffer in which case the second interface is an internal interface within the device (e.g., a memory bus).

The first agent device further has at least one processor component configured to run the process execution engine in accordance with the first finite state machine. This enables the first agent device to process the retrieved (buffered) messages. The first finite state machine may determine that all retrieved messages need to be provided to another agent for further processing. For example, the agent operating the first agent device may not have the appropriate authorizations to process the retrieved messages, or the first agent device is simply a message collector and router to distribute the messages received from the multi-agent devices to other agent devices or agents. The further processing of the retrieved messages may require the receiving further agents or agent devices to communicate with the entities specified by the reference identifiers in the original messages. In some cases the further processing may require the access to all received messages including their content portions. For this purpose, the first agent device generates an aggregate message according to the recursive data type including at least a subset of the buffered messages in the content portion of the aggregate message. This is enabled by the content portion sub-type message-set. A hierarchical message structure is created which includes now a reference identifier associated with the first agent device and all retrieved messages in the content portion. Each included (retrieved) message still includes the reference identifier of the original message by the multi-agent device and the respective content. Therefore, the aggregate message based on the recursive message data type enables reference passing and content passing across an arbitrary number of forwarding or message aggregation stages. As a consequence, the aggregate message can now be provided by the first agent device for further processing, either to a further agent operating the first agent device, or to a further agent operating a second agent device wherein the first agent device sends the aggregate message to the second agent device in accordance with the first state machine. In other words, exchange of messages is not required in all cases. For example, when two agents are operating the same agent device under different finite state machines the aggregate message associated with the sending agent may simply be stored in the buffer associated with the respective agent device from where it can be retrieved by the receiving agent.

In one example embodiment, the first finite state machine is configured to send a first message from the first agent device to the plurality of multi-agent devices wherein the first message is configured to trigger the generation of the plurality of messages by the plurality of multi-agent devices according to the second finite state machine.

In one example embodiment, the process execution engine of the first agent device is further configured to check the retrieved plurality of messages based on a pre-defined condition and to provide the aggregate message (e.g., to send the message to the at least second agent device) for further processing only in case the pre-defined condition is fulfilled.

In one example embodiment, the first agent device is a multi-agent device itself. That is, there is a further plurality of multi-agent devices all linked to the first agent class specification and thus showing an equivalent function behavior. For example, the receipt of messages from the multi-agent devices of the above described embodiment may be distributed to multiple agent devices (e.g., for load balancing reasons, or because of geographic spread of the message sending multi-agent devices). In this case, the at least second agent device may receive (e.g., via a further buffer for asynchronous message receipt) a plurality of aggregate messages from the further plurality of multi-agent devices controlled by the first finite state machine. The second agent device can then retrieve the plurality of aggregate messages from the further buffer and process the retrieved aggregate messages in accordance with a third finite state machine, the third finite state machine controlling the function of the second agent device. Again, the second agent device may not be authorized to perform the complete processing or may again simply act as a message collection and forwarding node. In this case, the second agent device can generate a further aggregate message including at least a subset of the retrieved aggregate messages in the content portion of the further aggregate message. The further aggregate message makes use of the recursive data type to add another hierarchy layer to the forwarded aggregate message which now includes the aggregate message sets received from the first multi-agent devices. Thereby, each aggregate message of a first multi-agent device includes the messages retrieved by the respective first multi-agent device. As a consequence, the recursive message data type allows the drill down to the original reference identifiers and message contents at any aggregation stage and therefore provides multi-level aggregation messages which can include the full set of data required a potential processor of the messages.

The disclosed embodiments allow message receiving agent devices (i.e., message communication devices of respective agents) to establish ad-hoc communication channels with other agent devices in a cascaded message routing process even when the at least some properties of the other agent devices are not known a priori by the message receiving agent devices. It can be differentiated between different levels of anonymousness of agent devices. In one case, the message sending agent device may be not known at all. In another case the message sending agent device may be known but the message type of the sent message is unknown. Establishing such ad-hoc communication channels with other agent devices is enabled by the recursive data type of the exchanged messages which allows a receiving message agent device to drill down to the original messages in an aggregate message at any aggregation level (i.e., at any stage of the messaging cascade) to retrieve the corresponding reference identifier and content. As a result, the receiving message agent devices can then establish a communication channel with the agent devices associated with the retrieved reference identifiers. In other words, the provided aggregate messages enable the receiving message agent device to independently proceed with the message processing in accordance with the respective finite state machine of the agent device because any information required for the further message processing is included in the aggregate message based on the recursive data type.

Further aspects will be realized and attained by means of the elements and combinations particularly depicted in the appended claims. It is to be understood that both, the foregoing general description and the following detailed description are exemplary and explanatory only and are not restrictive of the embodiments as described.

DETAILED DESCRIPTION

Figure 1:
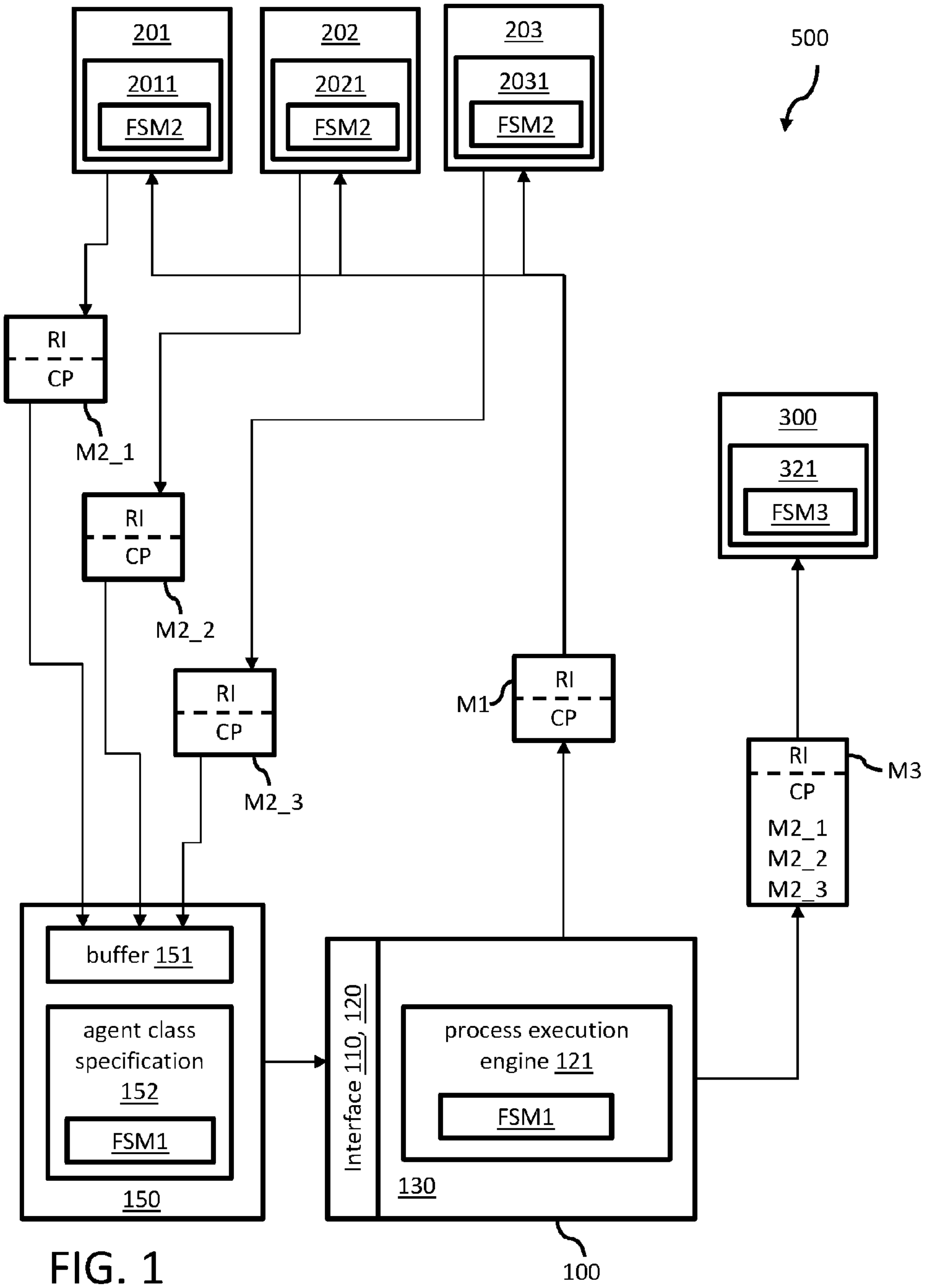
FIG. 1 is a simplified block diagram of a distributed computer system for message routing with content and reference passing according to an example embodiment.

FIG. 1 is a simplified block diagram of a distributed computer system 500 for message routing according to an example embodiment. FIG. 1 will be described in the context of FIGS. 2 and 3 which show a flow charts of a computer implemented method executed by one or more agent devices of the distributed system 500. The reference numbers used in the description refer to the corresponding elements of the FIGS. 1, 2 and 3.

In the example, the distributed system 500 includes a first agent device 100, a second agent device 300 and a plurality of multi-agent devices 201, 202, 203. Each agent device is controlled in its function and interaction behavior with the other agent devices by a corresponding agent class specification. In FIG. 1, only the agent class specification 152 which is associated with the first agent device is illustrated. The other agent devices are implemented in a similar matter. The agent class specification 152 can be stored in a storage component 150 which is communicatively coupled with the first agent device 100 through a respective first interface 110. Alternatively, the storage component 150 may be onboard of the agent device in which case a memory portion of the agent device 150 stores the agent class specification and the processor component 130 of the first agent device can access and use the memory via standard memory management technology. The agent class specification 152 includes a first finite state machine FSM1 which defines the internal behavior of the first agent device 100. The first finite state machine FSM1 is loaded 1100 (cf., FIG. 2) and executed by a process execution engine 121 of the first agent device. Such process execution engines are well known in the art. They may be based on the Business Process Execution Language (BPEL), the Business Process Model and Notation specification language (BPMN) or any other language which is appropriate to define the internal behavior of agent devices in a distributed system interaction context.

The other agent devices have a similar component structure. However, they are illustrated in a simplified manner by only showing the process execution engines configured to execute the respective finite state machines. The second agent device 300 runs the process execution engine 321 which is configured to process the finite state machine FSM3 controlling the function of the second agent device 300. The agent devices 201, 202, 203 are so-called multi-agent devices. That is, their respective process execution engines 2011, 2021, 2031 are configured to execute all the same finite state machine FSM2. In other words, the multi-agent devices show an equivalent behavior based on the finite state machine FSM2. That is, they interact with the other agent devices in a similar way according to FSM2.

In the example, the first agent device sends 1200 (FIG. 2) (in accordance with FSM1) a first message M1 to the multi-agent devices 201, 202, 203. The first message may be of a query type. The first message has a reference identifier RI (e.g., an IP address, a URL, an e-mail address, etc.) which can indicate to the receiving multi-agent devices an identifier allowing the receiving multi-agent devices to establish a communication with an agent device to which a response message is to be sent. In the example, the RI of M1 refers to the first agent device 100 itself. However, the RI of M1 could also indicate other agent devices as potential recipients of the expected response messages. Upon receipt of the first message M1, the multi-agent devices process the receive message according to their finite state machines FSM2 and generate response messages M2_1, M2_2, and M2_3. The sending 1200 (FIG. 2) and receiving of the first message M1 is optional in the sense that the finite state machine FMS2 of the multi-agent devices can be configured in such a way that the messages M2_1, M2_2, and M2_3 are generated on the initiative of the multi-agent devices without a need for receiving a query message at all.

In the example, the messages M2_1, M2_2, and M2_3 are then sent to the agent device associated with RI of M1. In general, the (response) messages are sent asynchronously by the multi-agent devices dependent on the status of the corresponding process execution engines 2011, 2021, 2031. Therefore, the messages M2_1, M2_2, and M2_3 are received 1300 (FIG. 2) by a buffer associated with the first agent device. This buffer 151 can be implemented in the storage component 150 either remotely accessible by the first agent device through a second interface 120, or it can be implemented as an integral part of the first agent memory. A person skilled in the art can use any known buffering method (e.g. FIFO, LIFO) for buffering the received messages in the buffer 151.

Figure 2:
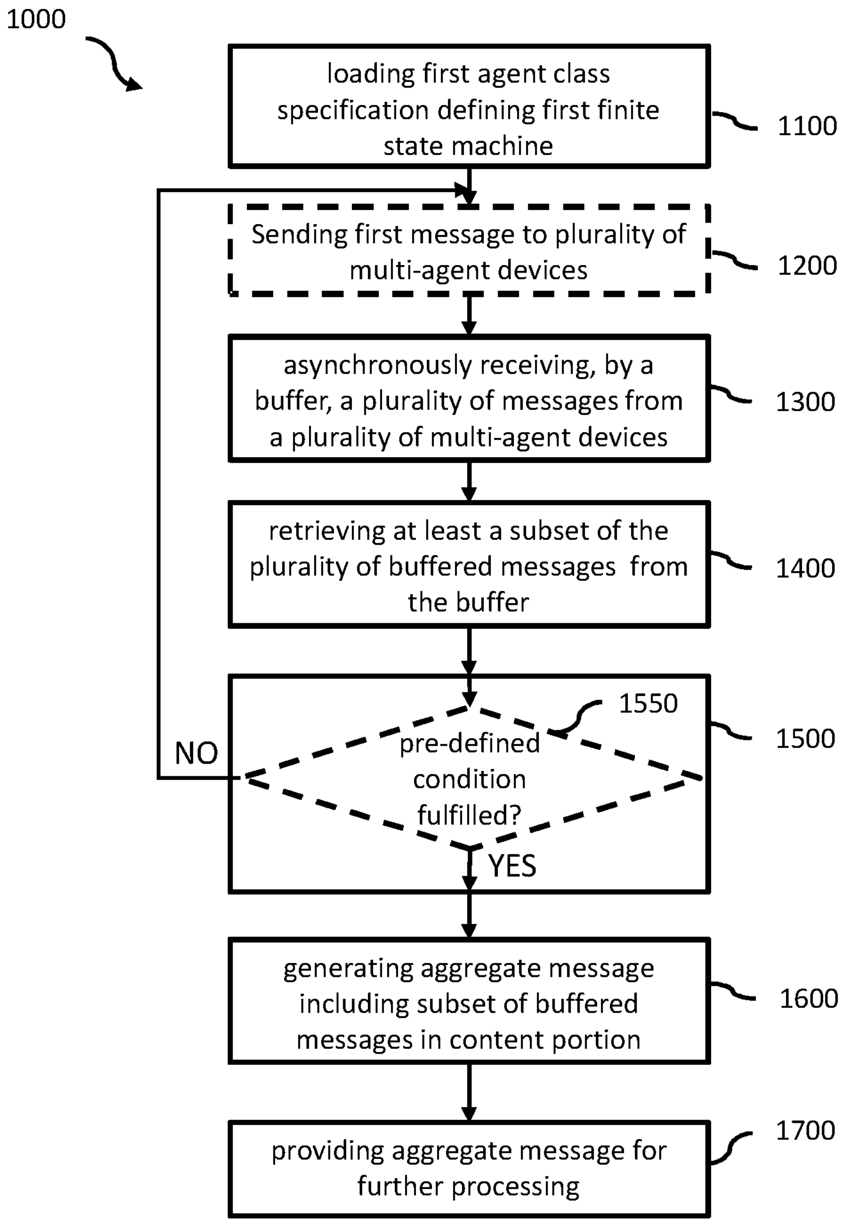
FIG. 2 is a flow chart of an example of a computer-implemented method for message routing with content and reference passing according to an embodiment.

The first agent device 100 can then retrieve 1400 (FIG. 2) at least a subset of the plurality of buffered messages M2_1, M2_2, and M2_3 from the buffer 151. For example, in case the buffered messages are sent in response to the query message M1, there may be a time limit associated for receiving the response. At the end of this time limit only M2_1 and M2_2 may have been received by the buffer. FSM1 may be configured to retrieve the buffered messages at the end of this time limit and it may define an additional time limit (e.g. one week after the end of the first time limit), to perform a second retrieval 1400 (FIG. 2) for delayed messages. In this second retrieval step the message M2_3 which may have arrived during the delay period, is the also retrieved. The first agent device 100 is now in possession of all relevant (response) messages for further message processing 1500 (FIG. 2).

In one embodiment, the first agent device 100 may simply act as a message collector and message aggregator. In this embodiment, the first agent device aggregates 1600 (FIG. 2) the retrieved messages or at least a subset of the retrieved messages M2_1, M2_2, and M2_3 into single aggregate message M3 which is then provided 1700 for further message processing. Thereby, the aggregate message M3 is generated 1600 based on a recursive data type used by the messages exchanged by the agent devices of the distributed system. The recursive data type has a sub-type for the RI portion of the messages and a further sub-type for the content portion CP of the messages. The CP sub-type has again sub-types defining the CP portion as a content type which is able to include message content, e.g., in the form of text or files or empty, or defining the CP portion as a message-set type which is able to store a plurality of messages. In the example, the received messages M2_1, M2_2, and M2_3 have a CP portion of the sub-type content which includes the responses of the multi-agent devices to the query message M1. For the aggregate message M3 the CP portion has the sub-type message-set. That is, the aggregate message M3 includes a reference identifier associated with the first agent device and includes in the content portion CP at least a sub-set of the retrieved messages. In the example, all retrieved messages M2_1, M2_2, and M2_3 are aggregated into CP of M3. The aggregate message M3 now includes all relevant information for further processing of the retrieved message set and allows any later processor of the message (i.e., any processor that receives the message at a later point in time) to establish a direct communication with the entities specified in the RI portions of the original received messages M2_1, M2_2, and M2_3. Thereby, any later processor has no need to know a priori the agent devices participating in the distributed system. By using a hierarchical message structure according to the recursive data type as disclosed, any later message processing device can always establish a direct ad-hoc communication channel with the agent devices specified in the RI portions of the original messages. Thus, an efficient multi-cascading reference and content passing is enabled by the recursive message data type.

The aggregate message can then be sent to the second agent device 300 for further processing or it may be provided for further processing to another agent operating the first agent device under a particular user account which is different from the user account that was used for retrieving aggregating the multi-agent response messages.

In another embodiment, the first agent device 100 may be able to conditionally process the retrieved messages on its own. For example, the first message device may have pre-defined conditions taken into account by the process execution engine 121 when processing the messages. Such pre-defined conditions may relate to authorizations for message processing with regards to particular message types or to particular groups of multi-agent devices. The pre-defined conditions may also relate to the nature or content of the retrieved messages or to other constraints associated with the retrieved messages. For example, the first agent device may be entitled to process messages only up to a certain maximum number of messages received. If the number is exceeded, the messages need to be aggregated and forwarded for further processing. In this embodiment, the aggregate message M3 is only generated 1600 in case the pre-defined condition is fulfilled 1550. Otherwise, the first agent device can finish the message processing on its own and then await new messages to be received. That is, when the pre-defined condition for message aggregation is not fulfilled the first agent device does not need to perform the message aggregation steps.

Figure 3:
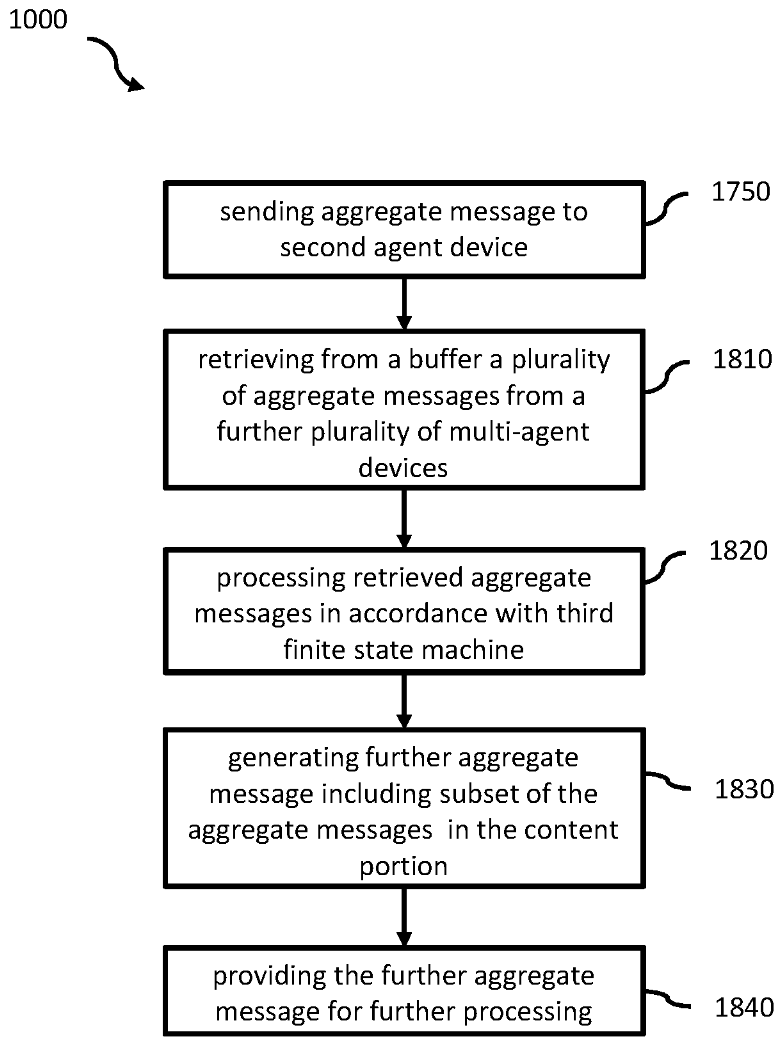
FIG. 3 is a flow chart for an example of a computer-implemented method for multi-level reference passing according to an embodiment.

FIG. 3 is a flow chart of a computer-implemented method according to one example embodiment, where the first agent device 100 is also a multi-agent device. That is, further multi-agent devices with process execution engines executing the same finite state machine FSM1 are available (not shown in FIG. 1). In this embodiment, the first agent device 100 sends 1750 (FIG. 3) the aggregate message M3 to a buffer (not shown) of the second agent device 300 for further processing. The buffer of the second agent device 300 also asynchronously receives further aggregate messages from the other multi-agent devices operated in accordance with FSM1. The second agent device 300 retrieves 1810 the received aggregate messages (or at least a subset of the received aggregate messages) from its buffer and processes 1820 the retrieved aggregate messages in accordance with its finites state machine FSM3. The second agent device 300 can now handle the aggregate messages received from the FSM1 operated multi-agent devices 100 in the same way as the first agent device 100 handled the messages from FSM2 multi-agent devices. For example, the second agent may be again a simple message collection and message aggregation node or it may be able to conditionally process the received aggregate messages. Dependent on the embodiment, in a similar manner as the first agent device, the second agent device 300 generates 1830 a further aggregate message (not shown) which includes at least a subset of the received aggregate messages in the content portion CP and provides 1840 the further aggregate message for further processing. For example, a third agent device may receive the further aggregate message and resolve the further aggregate message in accordance with the recursive data type down to the lowest aggregation level to retrieve the original reference identifiers to establish ad-hoc communication channels with other agent devices to complete processing of the further aggregate message.

Figure 4:
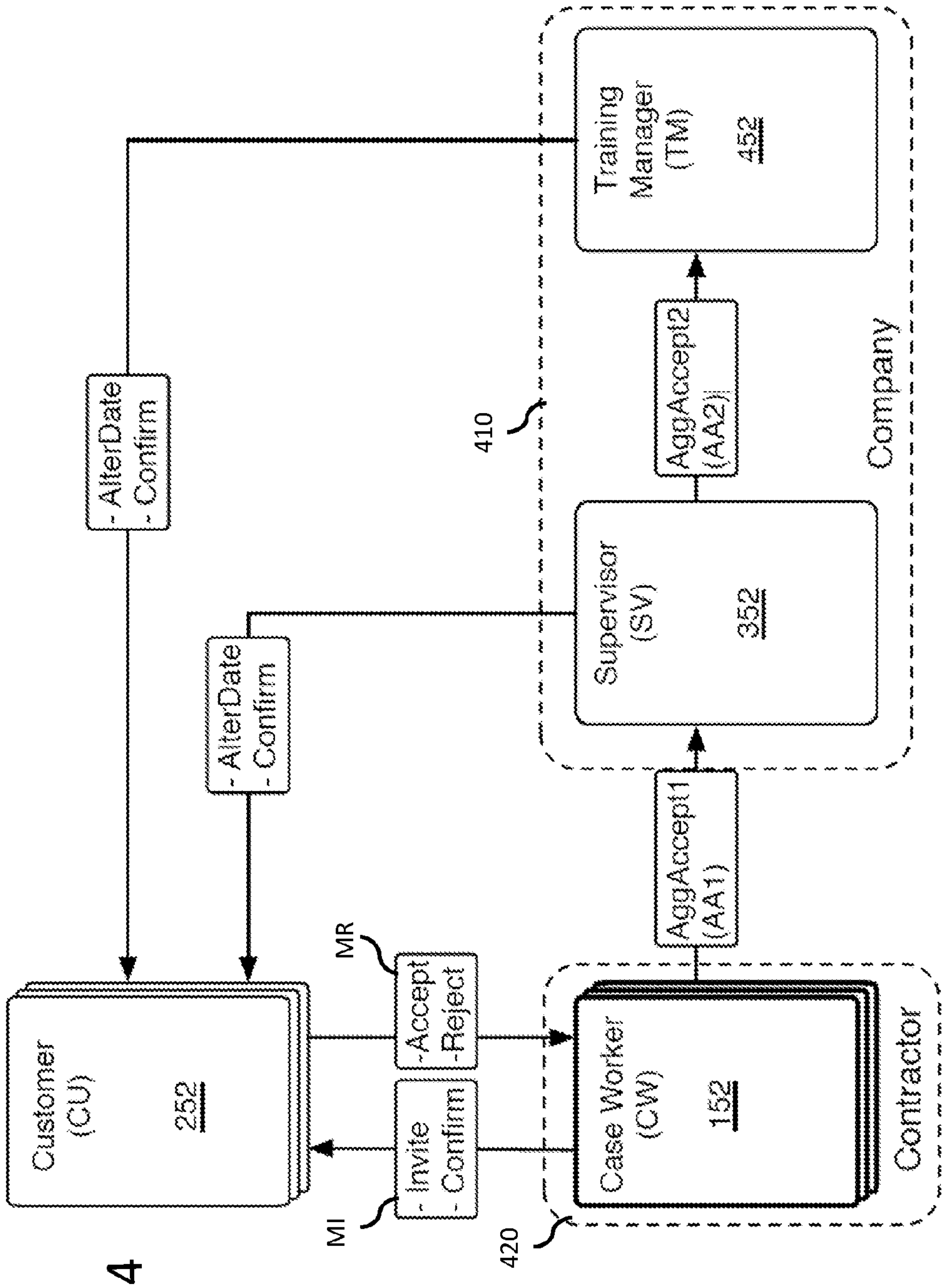
FIG. 4 is a scenario diagram illustrating a specific example for enabling ad-hoc communication between agent devices according to an embodiment.

FIG. 4 is a scenario diagram illustrating a specific example for enabling ad-hoc communication between agent devices according to an embodiment. The scenario outlines a cross company process with different types of agent devices involved. Two multi-agent class specifications (Case Worker 152 and Customers 252) are involved and two single-agent class specifications (Supervisor 352 and Training-Manager 452). In other words, at execution time, a plurality of customer multi-agent devices is linked to the Customer class specification 252 and a further plurality of multi-agent devices is linked to the Case Worker class specification, whereas to the Supervisor and Training-Manager class specification only a respective single agent device is linked.

In the scenario the agent devices associated with the class specification 352 and 452 belong to one interacting party: Company 410. The Company 410 may invite its Costumers to a product training workshop and commissions another company as Contractor 420 for preparing and sending "Invite" messages MI to the multi-agent devices associated with agent class specification 252. Also the receiving of the response messages MR (either as an "Accept"- or a "Reject"-message) is delegated to the Contractor 420.

Figure 6:
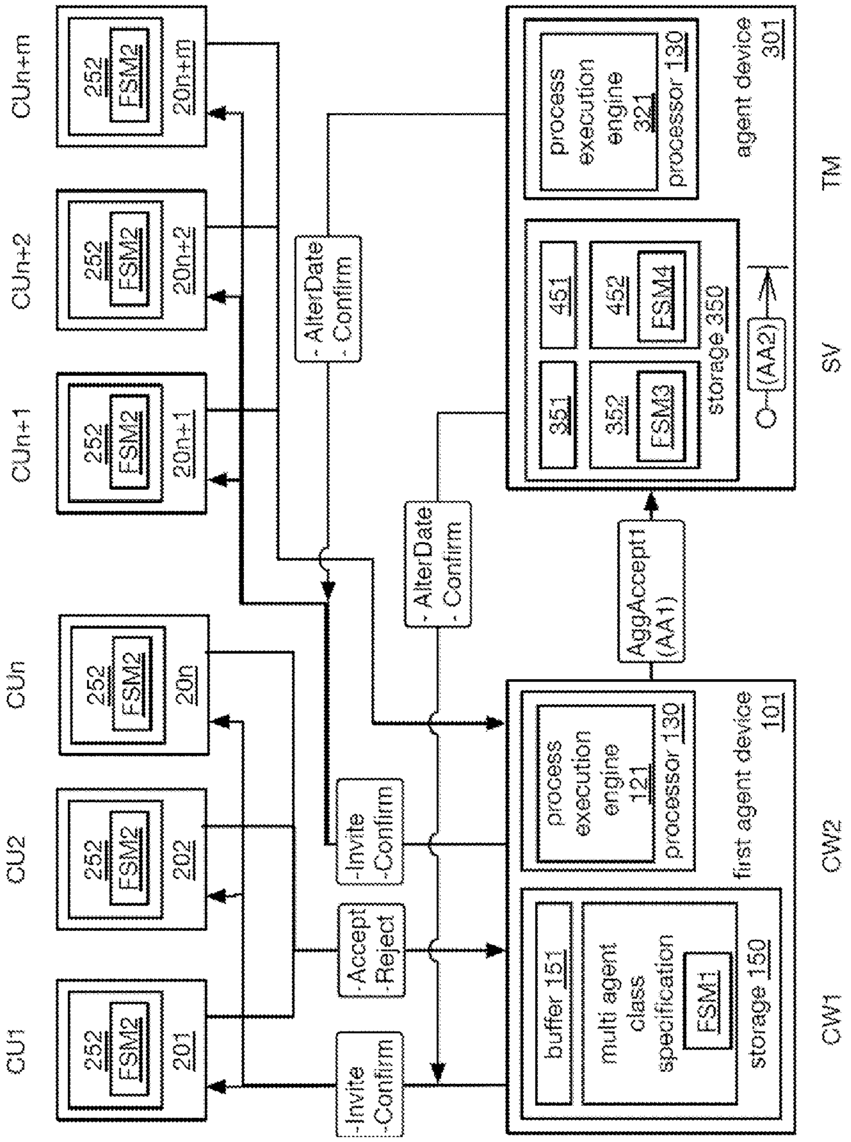
FIG. 6 is a simplified distributed system diagram illustrating a specific example for enabling ad-hoc communication between agent devices according to an embodiment.

Turning briefly to FIG. 6, it shows a more detailed but simplified system diagram of the distributed system for implementing the example scenario of FIG. 4. In the example, two agents CW1, CW2 (case workers) are both using the agent device 101 for interacting with other agent devices. The agent device 101 in this context is a multi-agent device operated by the finite state machine FSM1 of the corresponding Case Worker class specification 152. Alternatively, the case workers could also use separate multi-agent devices operated by FSM1. The agent device 301 is an agent device associated with the Supervisor class specification 352 including FSM3 and the Training Manager class specification 452 including FSM4. In this example, two different single-agent class specifications are executed by the same agent device 301 supporting the two agents SV, TM with different finite state machines. The multi-agent device 101 while operated by agent CW1 sends the invite message to the multi-agent devices CU1 to CUn linked to the Customer class specification 252 including FSM2. The multi-agent device 101 while operated by agent CW2 sends the invite message to the multi-agent devices CUn+1 to CUn+m also linked to the Customer class specification 252 including FSM2. In the example, CW1 sends the "Invite"-message MI via 101 to n FSM2 multi-agent devices whereas CW2 sends the "Invite"-message MI to m FSM2 multi-agent devices. At the multi-agent device 101, each Case Worker receives either Accept- or Reject-messages MR from the FSM2 multi-agent devices in response to the "Invite"-message MI.

For example, a pre-defined condition can define that in case the number of "Accept" messages does not exceed a maximum number of participants, CW1 and CW2 can confirm the invitation to the FSM2 multi-agent devices. To illustrate the send directions in FIGS. 4 and 6 the "Invite" and "Confirm" messages are illustrated as a single block although in reality they are separate messages which are also not sent at the same time. However, if the number of "Accept" messages exceeds the maximum number of participants, "Accept" messages are aggregated and sent to the Supervisor FSM3 agent device of the Company 410. Thus, the agent device 301 of the Supervisor receives two aggregate messages from CW1, CW2 (multi-agent device 101) each including a set of "accept"-messages in its content portion. In case the Supervisor agent device can complete the processing of the messages it would need to establish a communication channel with the respective multi-agent FSM2 devices to confirm or reject the participation in the training or to propose an alternative training date or time slot. In case the Supervisor or the respective agent device is not able or not authorized to send the messages to the FSM2 agent devices, it may forward the messages to another agent device (e.g., the Training Manager agent device) or provide them to another agent operating the same agent device. In the example, the agent device 301 is the agent device for both, the Supervisor and the Training Manager.

FIGS. 5A to 5D illustrate examples of finite state machines used to control corresponding FSM1 to FSM4 agent devices including examples for syntax and semantics of the function specification in the respective finite state machines.

As already described above, the function of an agent class specification or a multi-agent class specification is specified by a finite state machine with labeled transitions. An agent class specification is also referred to as single-agent class specification when the difference to a multi-agent class specification is emphasized. The syntax for an agent class specification start with "ACS".

The labels of the transitions include three different types:

1) Send action labels,
2) Retrieve action labels, and
3) Internal action labels.

Send and Retrieve actions enable the interaction between agent devices linked to different single-agent class or multi-agent class specifications. Internal actions or functions are sub-functions not visible for interaction partners. The following syntax may be used:

<Send>::=!<Messagetype[(<varname>]> to [<varname> of]<agent class name>

When the content of a variable is to be sent, the name of the variable and the name of the message type do not have to be equal. For the sake of simplicity, in the example, always equal names are used for variables and message types. For example "! AA2 to TM" stands for "! AA2(AA2) to TM" and sends the content of the variable AA2 as content of the message AA2. When the agent reference identifiers cannot be resolved by the agent devices, agent reference identifiers stored in a variable can be supplied in case the message content of the variable is a message-set. All reference identifiers of the messages included in the message-set are used as recipient references. In one embodiment, in case of a message cascade, only the reference identifiers of the top level of the cascade may be used.

Example: "! A to V of ACS2"

Meaning: The message "A" is sent to all references stored in variable V which belong to ACS2. It may be convenient to use the agent class name since an agent device can be associated to more than one agent class name at the same time.

<Retrieve>::=<(guard):>?[*]<Messagetype> from <agent class name>[=: <varname>]

<Internal Action>::=<function name>[=: <varname>]

The guard is a condition protecting the execution of actions. Only if the condition is true, the action is executed. A state of the respective finite state machine can have an arbitrary number of outgoing transitions. If guards are used, they have to be used for all labels of the outgoing transitions and only one guard can be true at the same time. This ensures that every state of a finite state machine of a particular agent class function has exactly one successor state. For Retrieve actions the "?" symbol is used while "!" is used for Send Messages. The "=:" operator distinguishes the storage of messages in a variable, i.e. a Message Content of type Message-Set is created and stored as content of the Variable.

Example: A state has three outgoing transitions "(x>5): ? A from ACS2=: V", "(0<x<=5): ? B from ACS2=: V" and "(x<=0): ? C from ACS3=: W"

Meaning: For example, if x>5 then a message of type A is retrieved from a buffer wherein the message was sent by an agent class device linked to the agent class specification ACS2 and the message is stored in the variable V. If x<=5 then a message of type B is retrieved from a buffer wherein the message was sent by an agent class device linked to the agent class specification ACS2 and the message is stored in the variable V. If x<=0 then a message of type C is retrieved from a buffer wherein the message was sent by an agent class device linked to the agent class specification ACS3 and the message is stored in the variable B. Thus, the retrieval can depend on the message type and the agent class specification associated with the agent device from which the message was sent. The variable name can be any name.

Referring back to FIGS. 4 and 6, in the example scenario, four agent class specifications are defined: two single agent class specifications 352, 452, and two multi-agent class specifications 152, 252.

In this example, agent {SV} is associated with 352, {TM} with 452, {CW1, CW2} with 152 and {CU1, CU2, . . . , CUn+m} with 252.

Figure 5A:
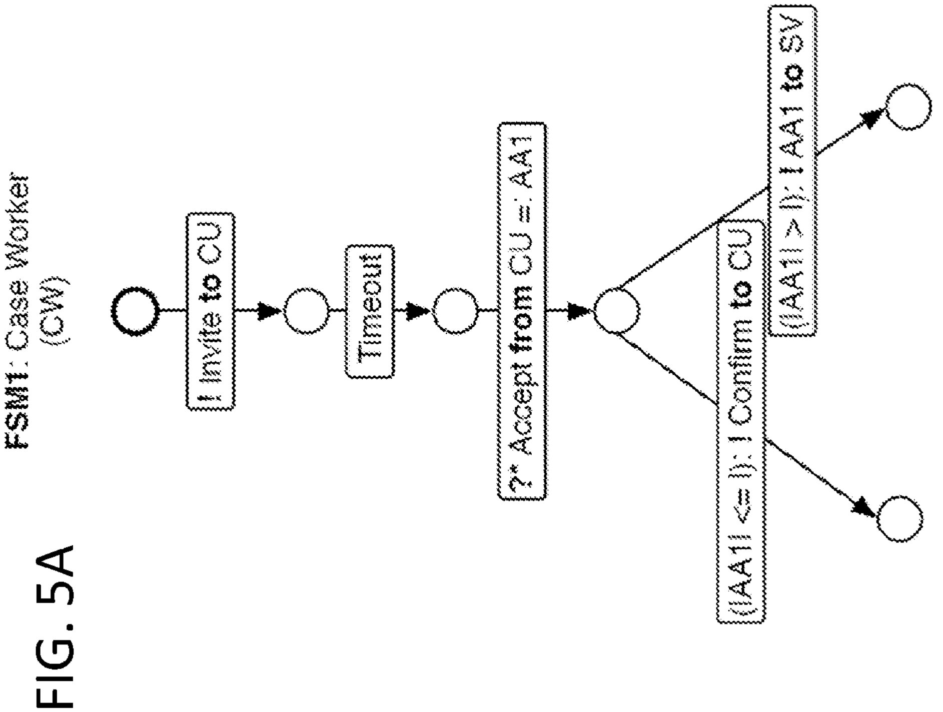
FIGS. 5A to 5D illustrate examples of finite state machines used to control corresponding agent devices.
Figure 7:
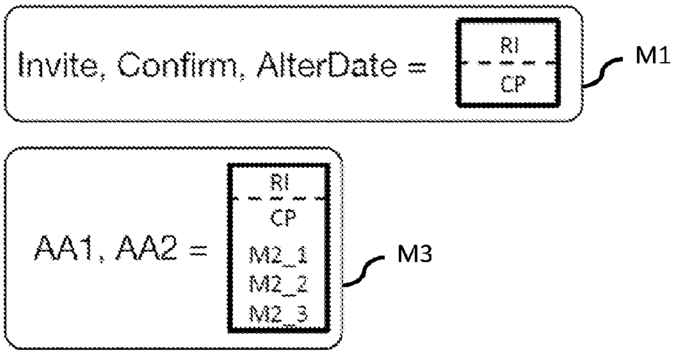
FIG. 7 illustrates a recursive message data type with two different sub-types for the content portion of a message according to an example embodiment.

Initially, the Case Workers CW1 and CW2 instantiate the process using the multi-agent device 101. Alternatively, CW1 and CW2 may use the same agent device with different user accounts. The process execution engines 121 of the multi-agent devices 101, 102 load the first finite state machine FSM1 of the agent class specification 152 as illustrated in FIG. 5A and enable the first action "! Invite to CU" for execution. Thus the "Invite" message is sent by the process execution engines (PEE) 121 to a set of multi-agent devices 201, 202, . . . , **20*n* controlled by the agents {CU1, CU2, . . . , CUn} and 20*n*+1, 20*n*+2, . . . , 20*n*+*m* controlled by the agents {CUn+1, CUn+2, . . . , CUn+m}. The structure of the messages is the same as the structure of the message M1 in FIG. 7** using the recursive data type.

Figure 5B:
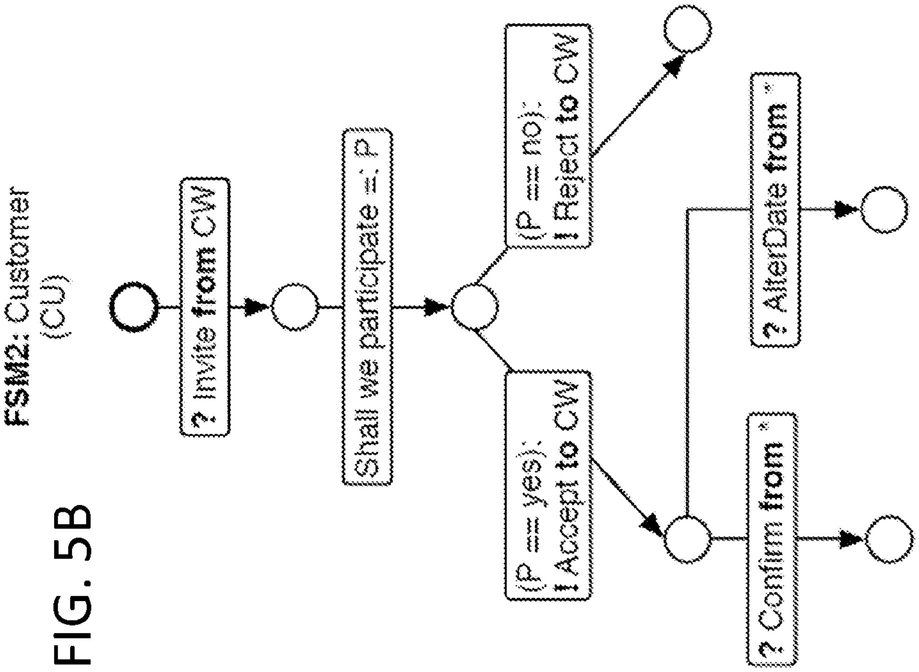

Afterwards, the internal action "Timeout" is performed by PEE 121 in order to stop the execution of the process for a certain period of time. Every multi-agent device 201, 202, . . . , **20*n*+*m* is storing the message on its own integrated or remote storage until a corresponding PEE of {201, 202, . . . , 20*n*+*m*} is executing the corresponding retrieve action. In this example, the retrieve action is specified in the finite state machine FSM2 of the multi-agent class 252 as illustrated in FIG. 5B. The execution is only described for the agent device 201 since the executions of 202, . . . , 20*n*+*m* are performed equivalently. By performing "? Invite from CW" a message of type "Invite" is retrieved from the concerning message buffer by the process execution engine of the multi-agent device 201. Afterwards the PEE of 201 is performing the internal action "Shall we participate=: P". The multi-agent device 201 can display the content of the invitation to its operating user (e.g., agent CU1) and receives the agent's input regarding whether the agent will participate or not. The input is stored in the variable "P". Depending on the content of "P" either the action "! Accept to CW" or the action "! Reject to CW" will be executed. Thus, the messages of the multi-agent devices 201 to 20*n* all operating according to FSM2 are sent to the buffer 151 of multi-agent device 101 and are stored therein. The messages of the multi-agent devices 20*n*+1 to 20*n*+*m* are sent to the buffer of the multi-agent device 102 and stored therein. After performing the "Timeout" action of FSM1 the process execution engine 121 retrieves all the "Accept" messages from the buffer 151 and stores them in the variable "AA1**" by performing the action "?* Accept from CU=: AA1". The variable "AA1" now includes a MessageContent of type MessageSet (cf., C03, C06 in FIG. 8) including all messages of type "Accept" sent by a subset of multi-agent devices In the example, a pre-defined condition is implemented in the finite state machine where the further execution of FSM1 depends on the cardinality of "AA1".

Figure 8:
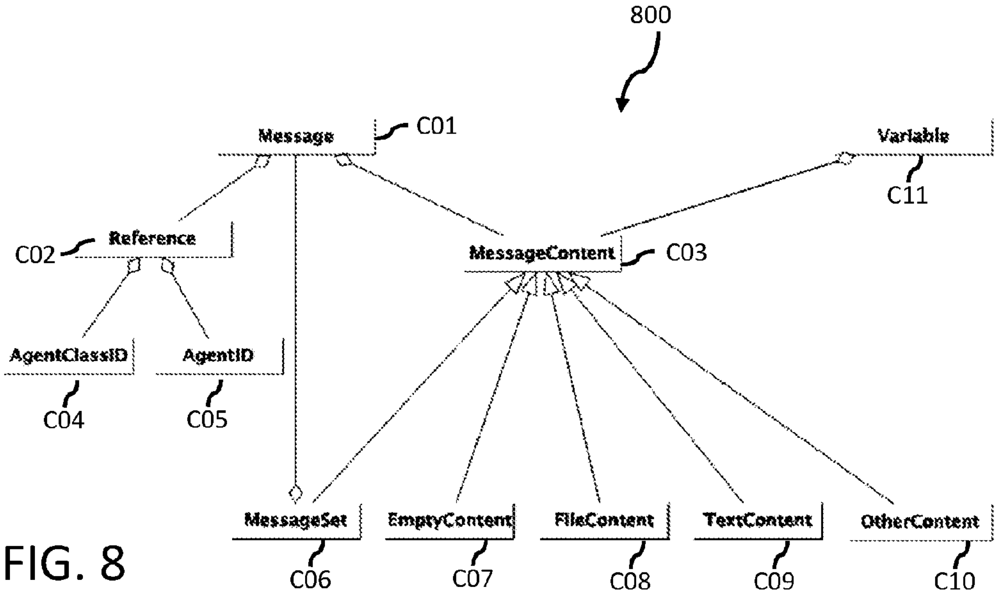
FIG. 8 is a class diagram of the recursive message data type enabling multi-cascaded reference passing in message routing.

If |AA1|<=l, the action "! Confirm to CU" is executed;

If |AA1|>l, the action "! AA1 to SV" is executed; the content of the variable "AA1" is the content of the message "AA1" like depicted in FIG. 8 wherein: l=the limit of the available seats.

If the number of retrieved accept messages is larger than the number of available seats, CW1 and CW2 forward the messages to the Supervisor (SV) agent device via PEE 121. In the example, it is assumed that both multi-agent devices CW1, CW2 received more accept messages than seats being available and therefore they need to forward the retrieved messages for further processing. The CW multi-agent device aggregates the messages to an aggregate message in compliance with the recursive data type by using the message-set sub-type "AA1". This message sub-type is structured like the message M3 illustrated in FIG. 7.

The process execution engine 321 of the supervisor SV executes the first action of the finite state machine FSM3 (illustrated in FIG. 5C) which is a receive action. Both messages of type "AA1" can be aggregated as well and stored in the variable "V". In the example, SV has access to more information about the customers and can process the received messages in a better way than the case workers. For example, the SV agent device 301 can retrieve the reference identifiers of all messages included in the received aggregate messages and check which customers associated with the retrieved reference identifiers have a premium status. For example, a predefined condition implemented through FSM3 checks if the number of premium customers is lower or equal than the number of available seats (|AA2|<=l), If this is the case, the SV agent device sends "Confirm" messages to those customers being identified as premium customers based on their reference identifiers. Further, an alternative appointment date "AlterDate" for the training workshop is sent to the non-premium customers (variable npc in FIG. 5C). For both options corresponding actions exist in the finite state machine FSM2 (cf. FIG. 5B) of the customer multi-agent devices. If the number of premium customers is larger than the number of available seats ((|AA2|>l), the SV agent device cannot make a final decision according to FSM3 and sends a further aggregate message of type "AA2" to the Training Manager (TM) agent device wherein the further aggregate message includes the aggregate messages of both Case Worker multi-agent devices as content portion of the message type "AA2" (cf. message M3 in FIG. 7).

Figure 5D:
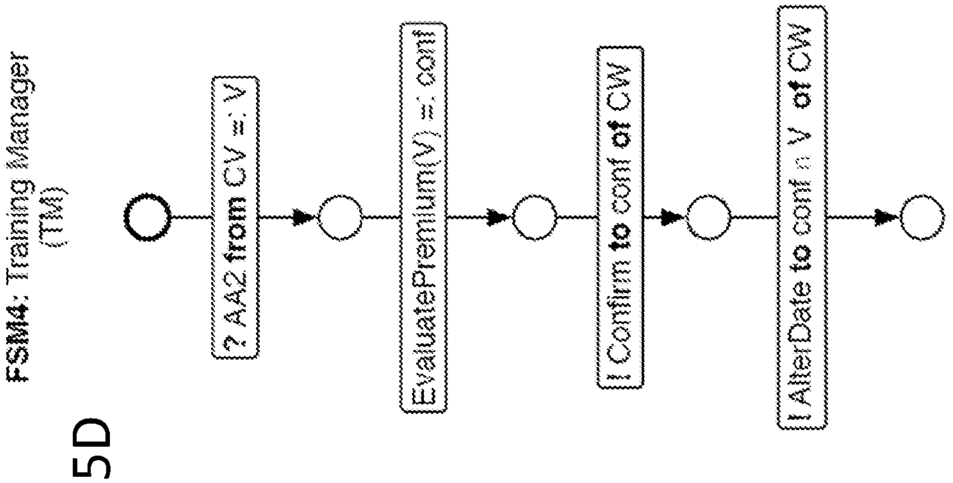
Figure 5C:
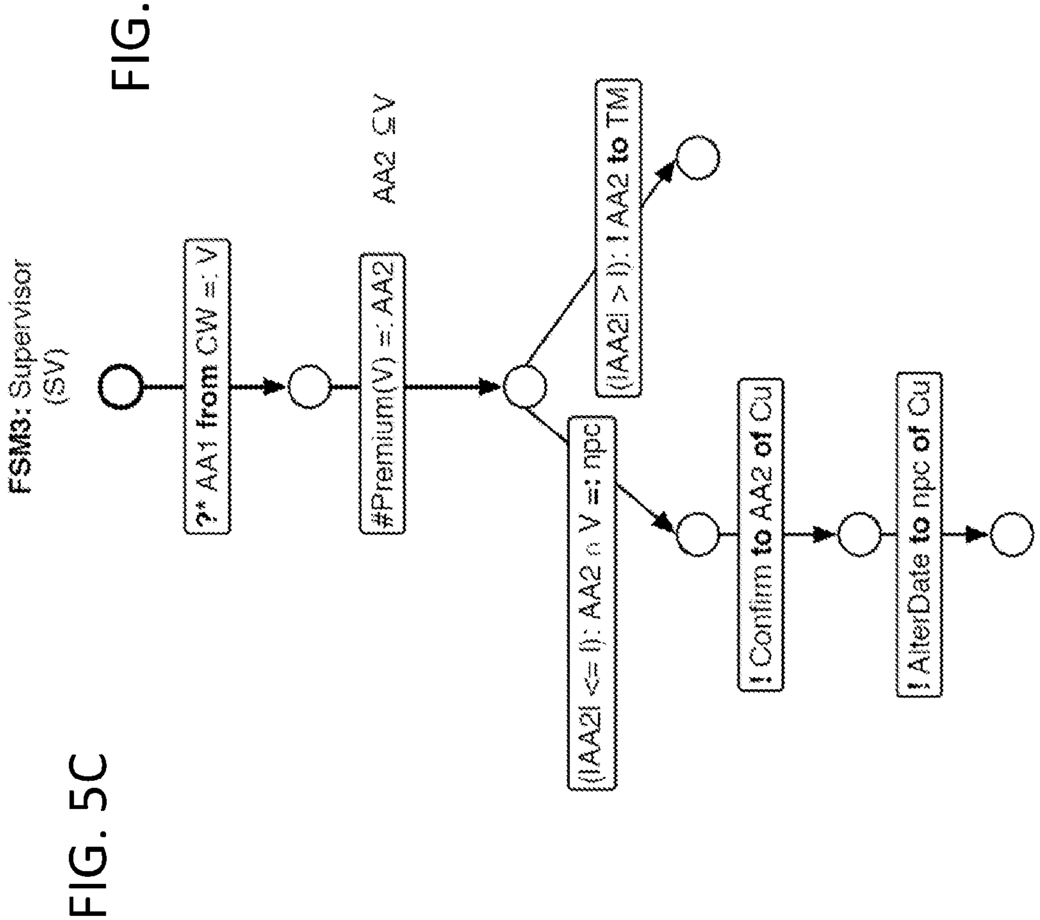

In the example embodiment of FIG. 6, FSM3 and FSM4 are stored on the same agent device 301, That is, SV and TM operate the same agent device under tow different user accounts. In this embodiment, "AA2" is delivered device-internally to the TM buffer 451. The process execution engine 321 can load FSM4 (as illustrated in FIG. 5D) and execute the first action "? AA2 from CV=: V" to receive the further aggregate message and to store it in the variable "V". In the example, only TM can finally decide which of the customers shall be invited according to the original workshop invitation and the result is stored in the variable "conf". Therefore, TM also needs to retrieve the reference identifiers associated with the original messages to be able to establish direct ad-hoc communication channels with the respective multi-agent client devices. In the next two FSM4 actions "Confirm" is sent to the customer references stored in "conf" and the "AlterDate" message to the remaining part of the customers. Finally, the multi-agent devices of the customers receive either the "Confirm" or the "AlterDate" message which can be retrieved afterwards.

FIG. 8 is a class diagram 800 of the recursive message data type enabling multi-cascaded reference passing in message routing. A Message C01 possesses a Reference C02 and a MessageContent C03. That is, for the purpose of reference passing and content passing an exchanged message includes at least a content portion and a reference identifier associated with a particular agent device. For other purposes, the message may include additional information, such as a process identifier, a process instance identifier or a correlation identifier. The Reference C02 possesses at least an AgentClassID C04 and an AgentID C05. C04 is used for Send and Retrieve commands. C04 is useful because if a message is sent by an agent device it may be required that the message is to be sent to a particular agent class for a distinct (unambiguous) assignment since in a general process model it is possible that messages of the same type are sent to more than one agent class. An agent device can only infer the correct agent class when the corresponding AgentClassID is unambiguous. For example, UUIDs can be used as AgentClassIDs. Received messages are stored in a message buffer associated with the respective receiving agent device. By executing a retrieve command, C04 can be used to retrieve only such messages which were sent to a certain agent class.

For example, an agent device ACD1 may be configured to receive messages of type A from other agent devices ACD2 and ACD3. In case that, when retrieving the messages from the buffer, the agent device ACD1 wants to distinguish the received type A messages by the sending agent devices the statements "? A from ACD2" or "? A from ACD3" can be used. If ACD1 does not care about the sending agent device the statement "? A from *" can be used.

The MessageContent C03 can be a MessageSet C06, an EmptyContent C07, a FileContent C08, TextContent C09, or any OtherContent C10.

The MessageSet C06 includes at least one Message C01. For reference and content passing with aggregate messages the MessageContent C03 is the MessageSet C06. The Variable C11 stores the MessageContent C03.

Example: An agent device AD has received messages of type "A" from another agent device (multi-agent device) executing the function of a multi-agent class MAC1. The agent device AD executes the action "?*A from MAC1=: V" of the function of the associated agent class AC1. Thus, V includes a MessageContent of type MessageSet including all messages of type A sent by the multi-agent device executing MAC1. If, in a next step, AD performs the action "! V to AC2", then a message of type V is sent with the content of the variable V, respectively the MessageSet which includes all messages of type A.

Figure 9:
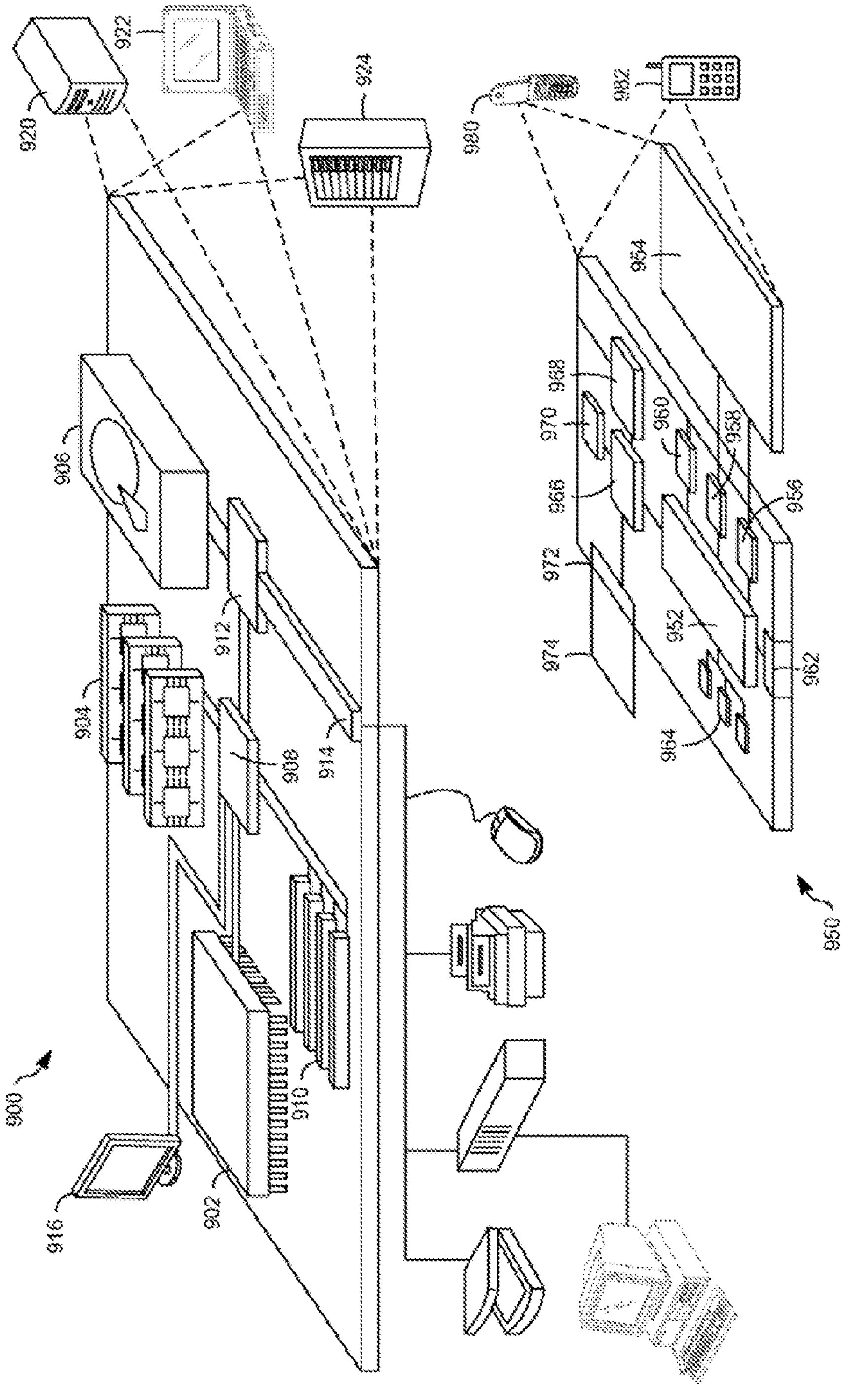
FIG. 9 is a diagram that shows an example of a computer device and a mobile computer device, which may be used with the techniques described here.

FIG. 9 is a diagram that shows an example of a computer device 900 and a mobile computer device 950, which may be used with the techniques described here. Computing device 900 is intended to represent various forms of digital computers, such as laptops, desktops, workstations, personal digital assistants, servers, blade servers, mainframes, and other appropriate computers. Computer device may 900 correspond to the computer system 100 of FIG. 1. Computing device 950 is intended to represent various forms of mobile devices, such as personal digital assistants, cellular telephones, smart phones, and other similar computing devices. For example, computing device 950 may include the data storage components and/or processing components of agent devices as shown in FIG. 1. The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A first agent device for an electronic messaging system that includes a plurality of agent devices interacting through exchange of messages, an exchanged message by the first agent device including a content portion and a reference identifier identifying a particular agent device, the reference identifier enabling any other agent device to establish a communication with the particular agent device, the content portion having a type which is either a content sub type or a message-set sub-type, wherein the message-set sub-type allows inclusion of a set of messages or aggregate message sets in the content portion of the message, the plurality of agent devices including a first agent device for message routing with content passing and reference passing, the first agent device comprising:

- a first interface component configured to load a first agent class specification defining a first finite state machine which is configured to control the function of the first agent device when executed by a process execution engine;
- a second interface component configured to retrieve at least a subset of a plurality of messages from a message buffer, the plurality of buffered messages originating from a plurality of multi-agent devices linked to a second agent class specification defining a second finite state machine wherein the first finite state machine and the second finite state machine enable the interaction of the first agent device with the plurality of multi-agent devices; and
- at least one processor component configured to run the process execution engine and, in accordance with the first finite state machine, to process retrieved buffered messages, to generate an aggregate message including at least a subset of the buffered messages in the aggregate message content portion having the message-set sub-type and to provide the aggregate message, in accordance with the first state machine, for further processing to a second agent device, or to another agent operating the first agent device.

2. The agent device of claim 1, wherein the process execution engine configured to provide the aggregate message for further processing includes that the process execution engine is configured to send the aggregate message to at least a second agent device.

3. The agent device of claim 1, wherein the first finite state machine is configured to send a first message to the plurality of multi-agent devices, the first message configured to trigger the generation of the plurality of messages by the plurality of multi-agent devices according to the second finite state machine.

4. The agent device of claim 1, wherein the messages are received asynchronously.

5. The agent device of claim 1, wherein the agent devices included in the plurality of multi-agent devices are configured to interact with the first agent device in an equivalent manner in accordance with the plurality of multi-agent devices.

6. The agent device of claim 1, wherein the process execution engine is further configured to check the retrieved plurality of messages based on a pre-defined condition and to provide the aggregate message for further processing only in case the pre-defined condition is fulfilled.

7. The agent device of claim 1, wherein the reference identifier of a particular retrieved message is associated with the multi-agent device from which the particular retrieved message originates.

8. The agent device of claim 1, wherein the agent device is a multi-agent device out of a further plurality of agent devices linked to the first agent class specification.

9. A computer-implemented method for message routing with content passing and reference passing for a distributed electronic messaging system with a plurality of interacting agent devices wherein the interaction between the interacting agent devices occurs through exchange of messages, an exchanged message including a content portion and a reference identifier associated with a particular agent device, the reference identifier enabling any other agent device to establish a communication with the particular agent device, the content portion having a type which is either a content sub-type or a message-set sub-type, wherein the message-set sub-type allows inclusion of a set of messages or aggregate message sets in the content portion of the message, the method comprising:

- loading, by a first agent device, a first agent class specification defining a first finite state machine which is configured to control the function of the first agent device when executed by a process execution engine;
- retrieving from a message buffer, by the first agent device, at least a subset of buffered messages, the buffered messages originating from a plurality of multi-agent devices linked to a second agent class specification defining a second finite state machine wherein the first finite state machine and the second finite state machine enable the interaction of the first agent device with the plurality of multi-agent devices;
- processing, by the first agent device in accordance with the first finite state machine, the retrieved buffered messages;
- generating an aggregate message including at least a subset of the buffered messages in the aggregate message content portion having the message-set sub-type; and, in accordance with the first state machine, providing the aggregate message for further processing to a further agent device, or to another agent operating the first agent device.

10. The method of claim 9, wherein the retrieved buffered messages are of the same message type.

11. The method of claim 9, further comprising:

prior to retrieving, sending, from the first agent device, a first message to the plurality of multi-agent devices, the first message configured to trigger the generation of the plurality of messages by the plurality of multi-agent devices according to the second finite state machine.

12. The method of claim 9, wherein the buffered plurality of messages are asynchronously received from the plurality of multi-agent devices by the message buffer.

13. The method of claim 9, wherein processing comprises checking the retrieved plurality of messages based on a pre-defined condition; and generating the aggregate message in case the pre-defined condition is fulfilled.

14. The method of claim 9, wherein the agent device is a multi-agent device out of a further plurality of multi-agent devices linked to the first agent class specification, and wherein providing the aggregate message for further processing includes sending the aggregate message to a second agent device, further comprising:

retrieving from a further buffer, by the second agent device, a plurality of aggregate messages from the further plurality of multi-agent devices;

processing, by the second agent device in accordance with a third finite state machine, the retrieved aggregate messages;

generating a further aggregate message including at least a subset of the aggregate messages in the content portion of the further aggregate message; and providing the further aggregate message for further processing.

15. A computer program product for message routing with content passing and reference passing in a distributed electronic messaging system with a plurality of interacting agent devices interacting through exchange of messages, an exchanged message including a content portion and a reference identifier identifying a particular agent device, the reference identifier enabling any other agent device to establish a communication with the particular agent device, the content portion having a type which is either a content type or a message-set type, the computer program product being tangibly embodied on a non-transitory computer-readable storage medium and comprising instructions that, when executed, cause at least one computing device to:

load, by a first agent device, a first agent class specification defining a first finite state machine which is configured to control the function of the first agent device when executed by a process execution engine;

retrieve from a message buffer, by the first agent device, at least a subset of buffered messages, the buffered messages originating from a plurality of multi-agent devices linked to a second agent class specification defining a second finite state machine wherein the first finite state machine and the second finite state machine enable the interaction of the first agent device with the plurality of multi-agent devices;

process, by the first agent device in accordance with the first finite state machine, the retrieved buffered messages;

generate an aggregate message including at least a subset of the buffered messages in the aggregate message content portion having the message-set sub-type; and, in accordance with the first state machine, provide the aggregate message to a second agent device, or to an agent operating the first agent device.

16. The computer program product of claim 15, wherein the retrieved buffered messages are of the same message type.

17. The computer program product of claim 15, wherein the instructions, when executed, further cause the at least one computing device to:

prior to retrieving, send, from the first agent device, a first message to the plurality of multi-agent devices, the first message configured to trigger the generation of the plurality of messages by the plurality of multi-agent devices according to the second finite state machine.

18. The computer program product of claim 15, wherein the buffered plurality of messages are asynchronously received from the plurality of multi-agent devices by the message buffer.

19. The computer program product of claim 15, wherein processing comprises checking the retrieved plurality of messages based on a pre-defined condition; and generating the aggregate message in case the pre-defined condition is fulfilled.

20. The computer program product of claim 15, wherein the agent device is a multi-agent device out of a further plurality of multi-agent devices linked to the first agent class specification, and wherein providing the aggregate message for further processing includes sending the aggregate message to a second agent device, and wherein the computer program product, when loaded into the memory and executed by the at least one processor, further causes the computing device to:

retrieve from a further buffer, by the second agent device, a plurality of aggregate messages from the further plurality of multi-agent devices;

process, by the second agent device in accordance with a third finite state machine, the retrieved aggregate messages;

generate a further aggregate message including at least a subset of the aggregate messages in the content portion of the further aggregate message; and provide the further aggregate message for further processing.

* * * * *